Nov. 7, 1961     N. GÜNTHER     3,007,366
STEREOSCOPIC RANGE FINDER
Filed July 5, 1960
Fig. 1
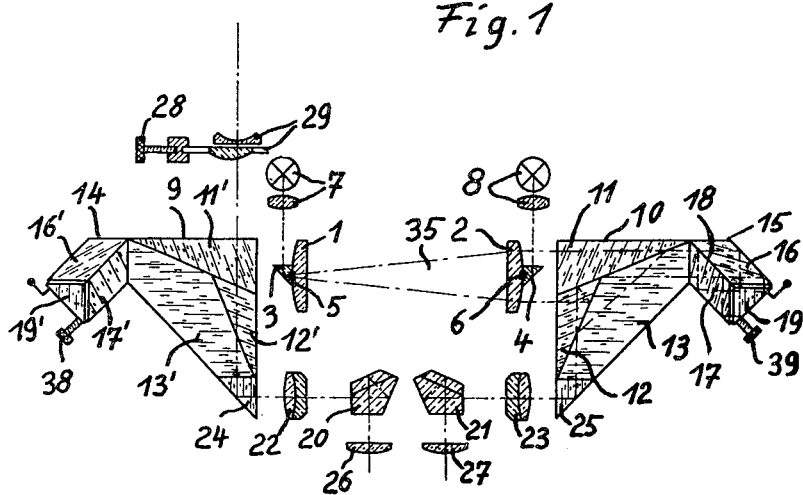
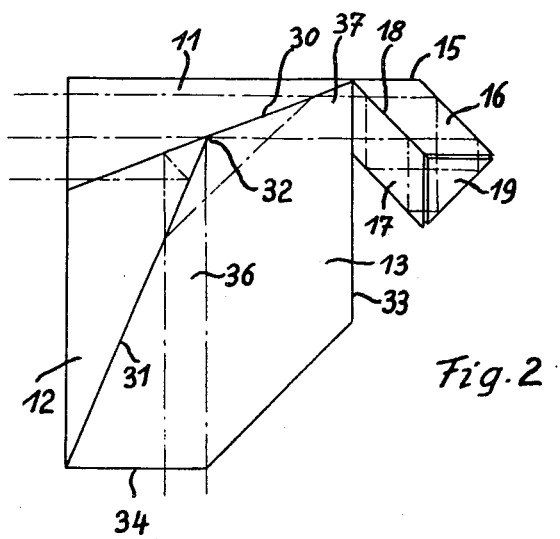
Fig. 2

United States Patent Office 3,007,366
Patented Nov. 7, 1961

3,007,366
STEREOSCOPIC RANGE FINDER
Norbert Günther, Aalen, Wurttemberg, Germany, assignor to Carl Zeiss, Oberkochen, Wurttemberg, Germany
Filed July 5, 1960, Ser. No. 40,737
Claims priority, application Germany July 30, 1959
4 Claims. (Cl. 88—2.7)

The present invention relates to a stereoscopic range finder, and particularly to one which is equipped with a collimator having luminous markers and two coaxially arranged collimator objectives, each of which carries a solid marker. A partially transparent reflecting square causing a deflection of 90° is arranged in each light path of the collimators for combining the light paths of the marker and object images. Outside of the reflecting squares of 90° deflection are arranged in the extension of the collimator axis additional stationary reflecting squares causing a 180° deflection. The reflecting squares causing a 90° deflection are tiltable into a position in which they will combine the collimator light path for the marker image, which is reflected by the 180° reflecting squares, with the light path of the object image.

In order to avoid the sometimes disturbing separation of the exit pupil of the range finder which is produced by the roof edge effect of the 180° reflecting square, it was proposed previously to provide instead of the 180° reflecting squares a number $2n+2$ ($n=1, 2, 3, 4 \ldots$) mirror surfaces which will split the light beams coming from the respective collimator objective into two partial light beams. These partial light beams will be deflected in the same path but opposite to each other about an angle of 180°, and will physically combine at the point of the incident light beam.

In order to effect a range measurement two measurements are necessary when the above described range finder is used. The 90° reflecting square will have to be shifted between the first and the second measurements. The above described measure will assure that the measurements will always be correct, independent of any changes in the position of said reflecting squares.

The shifting of the reflecting squares and the second measurement are rather time-consuming and this is in some cases undesirable.

The present invention eliminates this disadvantage and provides a stereoscopic range finder which makes any shifting of the reflecting squares and the second measurement superfluous.

The object of the present invention is to provide in place of the shiftable 90° reflecting squares several mirror surfaces when are used to split the light beam coming from the respective collimator objective into two partial light beams for direct deflection of one of these partial light beams about an angle of 90° and for deflection of the other partial light beam also about an angle of 90°, which other partial light beam is reflected in itself by mirror surfaces deflecting about an angle of 180° and being disposed outside of the first mentioned mirror surfaces.

Therefore, in the stereoscopic range finder according to the present invention one part of the light beam coming from the corresponding collimator objective will be directly deflected about 90° in the range finder itself, while the other part of the light beam will be directed by the 180° deflecting surface and will, after being reflected in itself, be deflected about 90° in the actual range finder. The mirror surfaces which are used for deflection of the two partial light beams have, therefore, the property to deflect by the same angular amount the partial light beams impinging from both sides onto said mirror surfaces. This type of arrangement will produce the same results as the shifting of the reflecting squares about 90°, as was disclosed in the previously described device. Also in this case, in each distorted position of the 90° reflecting squares a deflection of the two partial light beams about equal amounts of distortion in opposite direction will be obtained. This will split the marker image into two marker images which will be symmetrically disposed relative to the correct position. In carrying out the measurements the target can be enclosed between the two separate marker images so that the correct mean value of the measurement will be automatically obtained. It is, however, also possible to bring the two marker images to coincidence by means of an appropriate adjustment.

The mentioned surfaces are preferably formed by suitably designed prisms. Care should be taken that the partial light beams which are split by the mirror surfaces will be recombined after having been deflected.

The invention will now be described in detail on hand of an exemplary embodiment as shown in the accompanying drawings, in which:

FIG. 1 shows a stereoscopic range finder in which mirror surfaces are employed according to the present invention in place of 90° reflecting squares, and FIG. 2 shows a prism combination made of a plurality of prisms and used for deflecting the light about 90°.

FIG. 1 shows a schematic presentation of a stereoscopic range finder according to the invention. The main planes of the collimator objectives 1 and 2 form at the same time the focal planes of the other objective and have mounted thereon the measuring markers 5 and 6. These markers are illuminated by the two light sources 7 and 8 and the prisms 3 and 4. The light is directed to the two elements 9 and 10 made in accordance with the present invention. Each of these elements 9 and 10 consists of three partial prisms 11, 12 and 13. Additional prisms 14 and 15 are arranged outside of the elements 9 and 10. Each of these additional elements consists of two orthorhombic prisms 16 and 17, which are cemented together along the surface 18, and which enclose a rectangular prism 19. The cemented surface 18 is semi-transparently reflective and is inclined at an angle of 45° with respect to the incoming light beam. This light beam will be split on said surface 18 into two partial light beams which are deflected at an angle of 180° in two oppositely extending paths, and are finally recombined on said surface 18.

The real range finder consists of the two prisms 24 and 25, two objectives 22 and 23, two additional prisms 20 and 21, and the two oculars 26 and 27. The range measurement itself is effected by a manually operable adjusting device 28 which is used to actuate one of the two laterally slidably adjustable lenses 29. The prisms 24 and 25 are preferably cemented to the two elements 9 and 10.

FIG. 2 shows the element 10 in enlarged scale. It will be noted that the partial prism 11 is of rectangular shape and is arranged in such a manner that one of its short surfaces faces the direction of the incident light. Its hypotenuse surface 30 is inclined at an angle of 22.5° toward the direction of the incident light beam. Another partial prism 12 is cemented to the partial prism 11 and its hypotenuse surface 31 is inclined at an angle of 67.5° relative to the direction of the incident light beam. The surfaces 30 and 31 are partly transparent and therefore partly reflective and enclose an angle of 45°. The free portion of the hypotenuse surface 30 of the rectangular partial prism 11 and the hypotenuse surface 31 of the other partial prism 12 are cemented to a further partial prism 13 which is disposed vertically to the incident light beam and which is provided with free surfaces 33 and 34 disposed vertically to the direction of the deflected light beam.

The operation of the stereoscopic range finder in accordance with the present invention is as follows:

The light bundle coming from the marker 5 is made parallel by the objective 2. This parallel light bundle is split into two partial light beams 36 and 37 by the element 10. The edge 32 between the hypotenuse surfaces 30 and 31 forms hereby the division edge of the two partial light beams. The lower partial light beam 36 (FIG. 2) is deflected at an angle of 90° by the two reflective surfaces 30 and 31. The upper partial light beam 37 reaches first the element 15 and then is deflected at an angle of 180° by the same, and is then reflected in itself in a rearward direction. The reflected light beam is also deflected by the reflective surfaces 30 and 31 about an angle of 90° in a downward direction. The arrangement of the reflective surfaces is such that the two partial light beams 36 and 37 are brought into coincidence after their deflection.

Since the same two reflective surfaces 30 and 31 are used for deflecting the partial light beams 36 and 37, any distortion in the position of the mirror surfaces which may occur due to outer influences will not influence the measuring result. In any such cases the two partial light beams will be deflected in opposite equal amounts so that the mean value of the deflected light beams will remain correct.

The function of the luminous marker collimator described with reference to the marker 5 and the element 10 is the same with reference to the marker 6 and the element 9. The light beam coming from the marker 5 is shown in FIG. 1 only for clarity purposes.

As is illustrated in the left hand portion of FIG. 1 the light beams coming from the target will pass unobstructed through the partial prisms 11', 12' and 13' and will be reflected by the prism 24 into the actual observation portion of the range finder. The light beams coming from the luminous marker collimator and from the target will be combined at the reflective surface of the prisms 24 and 25.

The reflective surfaces 30 and 31 are produced in such a manner that the same will reflect approximately 10% of the incident light.

In case of an intensive sun illumination it may happen that a splitting of the measuring marker in the rear reflection prisms 14 and 15 takes place. Such a disturbance can easily be corrected by the adjusting screws 38, 39 (FIG. 1). These screws permit a tilting of the rectangular prisms 19 and 19', respectively, to such an extent that a division of the marker image will be avoided.

The stereoscopic range finder according to the present invention has the property that it adjusts itself fully automatically.

Any mechanical or thermal influence either affects the marker and the target ray path in the same manner, or the marker will be split in such a manner that its stereoscopic center of gravity will remain correct. Under certain circumstances it may be advisable to make the angle between the mirror surfaces 30 and 31 not exactly equal to 45° but to deviate slightly from this size. In a correct position of the adjusting screw there will then appear two marker images at different distances. The target is then adjusted between these images during the measurement.

Owing to thermal influences an air wedge may be formed in the luminous marker collimator which is particularly disturbing at high altitude measurements. This however, can be easily eliminated by a helium filling of the collimator.

What I claim is:
1. In a stereoscopic range finder, the combination of an illuminated marker collimator including two coaxial collimator objectives, each provided with a solid marker, an optical element disposed in the light beam of each one of said collimator objectives for splitting said beam into two partial light beams and deflecting one of the same about an angle of 90°, means forming reflective surfaces arranged adjacent to said optical element in the extension of the collimator axis, said reflective surfaces deflecting the other one of said partial light beams coming from the respective collimator objective about an angle of 180° toward said optical element for recombination with said first mentioned partial light beam, each one of said optical elements having stationary reflective surfaces which split the light beam coming from the respective collimator objective into said two partial light beams for directly deflecting one of said partial light beams about said angle of 90°, while other stationary reflective surfaces on said optical elements deflect the other partial light beam after its 180° deflection on said optical elements about an angle of 90°.

2. A stereoscopic range finder according to claim 1, in which said stationary reflective surfaces are arranged in such a manner that the two partial light beams, after being reflected, are combined.

3. A stereoscopic range finder according to claim 1, in which said stationary reflective surfaces are formed firstly by a rectangular prism, the hypotenuse surface of which is disposed with respect to the incident light beam at an angle of 22.5° while one of the short surfaces of said prism faces the incident light beam, said hypotenuse surface being partially transparent, said reflective surfaces being formed secondly by another prism the hypotenuse of which is inclined about an angle of 67.5° with respect to said incident light beam, said second hypotenuse surface being partially transparent and reflective and one of its short sides being cemented to the hypotenuse surface of said first mentioned rectangular prism, whereby the edge formed between the hypotenuse surfaces of said two prisms constitutes the division edge of the two partial light beams.

4. A stereoscopic range finder according to claim 1, in which said stationary reflective surfaces are formed firstly by a rectangular prism, the hypotenuse surface of which is disposed with respect to the incident light beam at an angle of 22.5° while one of the short surfaces of said prism faces the incident light beam, said hypotenuse surface being partially transparent, said reflective surfaces being formed secondly by another prism the hypotenuse of which is inclined about an angle of 67.5° with respect to said incident light beam, said second hypotenuse surface being partially transparent and reflective and one of its short sides being cemented to the hypotenuse surface of said first mentioned rectangular prism, whereby the edge formed between the hypotenuse surfaces of said two prisms constitutes the division edge of the two partial light beams, the free portion of the hypotenuse surface of the first mentioned rectangular prism and the hypotenuse surface of the other prism being cemented to a further prism which is provided with free surfaces which are arranged at right angles to the incident light beam and at right angles to the deflected light beam.

References Cited in the file of this patent
UNITED STATES PATENTS

| | | |
|---|---|---|
| 1,918,527 | Eppenstein | July 18, 1933 |
| 2,144,257 | Eppenstein | Jan. 17, 1939 |